United States Patent [19]

Takasaki et al.

[11] Patent Number: 4,882,490
[45] Date of Patent: Nov. 21, 1989

[54] LIGHT BEAM SCANNING APPARATUS HAVING TWO DETECTORS WHOSE SIGNAL RATIO INDICATES MAIN SCANNING POSITION

[75] Inventors: Yoshimi Takasaki; Akira Yamaguchi; Ryoichi Yoshimura, all of Kanagawa, Japan

[73] Assignee: Fuji Photo Film Co., Ltd., Kanagawa, Japan

[21] Appl. No.: 249,062

[22] Filed: Sep. 22, 1988

[30] Foreign Application Priority Data

Sep. 22, 1987 [JP] Japan .............................. 62-239783
Oct. 1, 1987 [JP] Japan .............................. 62-248512

[51] Int. Cl.$^4$ ........................... H01J 3/14; H01J 5/16; H01J 40/14
[52] U.S. Cl. ..................................... 250/236; 350/6.6
[58] Field of Search ............... 250/234, 235, 236, 209; 350/6.1, 6.5, 6.6, 6.9; 358/293, 294

[56] References Cited

U.S. PATENT DOCUMENTS 3,864,036  2/1975  Vanheerentals .................... 250/236
4,039,246  8/1977  Voigt .................................. 250/236
4,329,011  5/1982  Mori et al. .......................... 350/6.6

Primary Examiner—David C. Nelms
Assistant Examiner—William L. Oen
Attorney, Agent, or Firm—Sughrue, Mion, Zinn, Macpeak & Seas

[57] ABSTRACT

A light beam scanning apparatus scans an object such as a stimulable phosphor sheet by applying a light beam deflected in a main scanning direction to the object while moving the object in an auxiliary scanning direction substantially normal to the main scanning direction. The light beam scanning apparatus includes first and second light detectors such as photodiodes juxtaposed in the main scanning direction and having respective light detecting surfaces extending in the auxiliary scanning direction. The first and second light detectors produce respective output signals at a predetermined ratio when the light beam for scanning the object in the main scanning direction is in a reference main scanning position, and produce respective output signals at a ratio varied from the predetermined ratio when the light beam is deviated from the reference main scanning positon. The main scanning position of the light beam with respect to the object can be detected from the ratio of the output signals of the first and second light detectors.

9 Claims, 7 Drawing Sheets

LIGHT BEAM SCANNING APPARATUS HAVING TWO DETECTORS WHOSE SIGNAL RATIO INDICATES MAIN SCANNING POSITION

BACKGROUND OF THE INVENTION

The present invention relates to a light beam scanning apparatus for scanning an object with a light beam to read or record an image or the like, and more particularly to a light beam scanning apparatus which is capable of detecting the scanning position of a light beam with respect to an auxiliary scanning direction for effecting a reading or recording process highly accurately.

There has recently been known a radiation image information recording and reproducing system for producing the radiation-transmitted image of an object using a stimulable phosphor material capable of emitting light upon exposure to stimulating rays. When a certain phosphor is exposed to a radiation such as X-rays, α-rays, β-rays, γ-rays, cathode rays, or ultraviolet rays, the phosphor stores a part of the energy of the radiation. When the phosphor exposed to the radiation is subsequently exposed to stimulating rays such as visible light, the phosphor emits light in proportion to the stored energy of the radiation. The phosphor exhibiting such a property is referred to as a "stimulable phosphor".

In the radiation image recording and reproducing system employing such a stimulable phosphor, the radiation image information of an object such as a human body is stored in a sheet having a layer of stimulable phosphor, and then the stimulable phosphor sheet is scanned with stimulating rays such as a laser beam to cause the stimulable phosphor sheet to emit light representative of the radiation image. The emitted light is then photoelectrically detected to produce an image information signal that is electrically processed for generating image information which is recorded as a visible image on a recording medium such as a photosensitive material or displayed as a visible image on a CRT or the like.

The radiation image recording and reproducing system includes an image reading apparatus for reading image information from a stimulable phosphor sheet on which the image information is recorded. In the image reading apparatus, prior to a reading process (hereinafter referred to as a "main reading mode") in which the sheet is scanned with stimulating light to reproduce a visible image to be observed, a preliminary reading mode is carried out by applying stimulating light, which is of a lower energy level than that of the stimulating light applied in the main reading mode, to the sheet for roughly reading the radiation image information in order to establish reading conditions and/or image processing conditions to be employed in the main reading mode.

Figure 1:
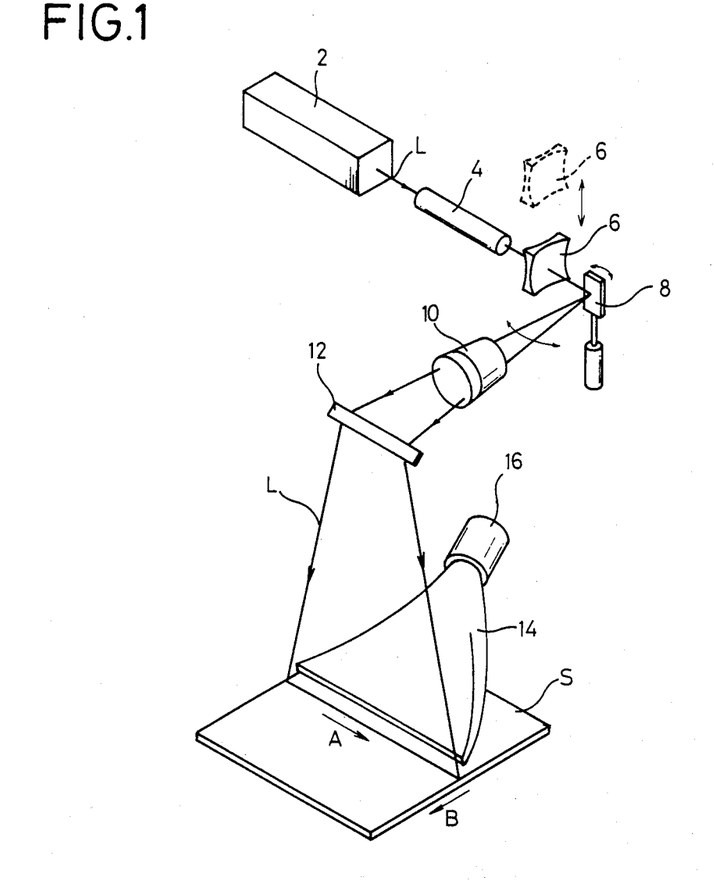
FIG. 1 is a schematic perspective view of a conventional image reading apparatus.

More specifically, as shown in FIG. 1 of the accompanying drawings, a laser beam L emitted from a laser oscillating tube 2 is adjusted to a prescribed beam diameter by a beam expander 4. Thereafter, the diameter of the laser beam L is increased by a concave lens 6 which is a preliminary reading optical system inserted in the light path, and then the laser beam L is applied to the reflecting surface of a galvanometer mirror 8. The laser beam L of increased diameter is deflected by the galvanometer mirror 8 as it swings, while the laser beam L is passing through a scanning lens 10 and being reflected by a mirror 12, so as to scan a stimulable phosphor sheet S in a main scanning direction indicated by the arrow A. At the same time, the stimulable phosphor sheet S is fed in an auxiliary scanning direction indicated by the arrow B by a feed means (not shown), so that image information carried on the surface of the sheet S is two-dimensionally scanned by the laser beam L. Light emitted from the stimulable phosphor sheet S upon exposure to the laser beam L is applied through a light guide 14 to a photomultiplier 16, which then photoelectrically converts the light into an electric signal. The electric signal which represents the radiation image information on the sheet S is processed to establish reading conditions and/or image processing conditions to be used in a main reading mode.

After the preliminary reading mode, the stimulable phosphor sheet S is moved back to a reading starting position. Thereafter, the main reading mode is started. The concave lens 6 is retracted out of the light path of the laser beam L into a broken-line position. Then, the laser beam L from the laser oscillating tube 2 is applied, with a prescribed energy level and beam diameter, to the stimulable phosphor sheet S to cause the latter to emit light representative of the recorded radiation image information. The emitted light is then photoelectrically converted into an electric signal based on the reading conditions established in the preliminary reading mode. Thereafter, the electric image signal is processed under the image processing conditions established in the preliminary reading mode for thereby reproducing a visible image of excellent observability.

In the image reading apparatus of this type, if the concave lens 6 is inserted in an inaccurate position in the preliminary reading mode, reading conditions and/or image processing conditions cannot accurately be established. More specifically, if the concave lens 6 is not inserted in a prescribed position in the path of the laser beam L, the laser beam L may be deflected, for example, by the concave lens 6, and may not be applied to a desired position on the stimulable phosphor sheet S. When this happens, the scanning position of the laser beam L in the preliminary reading mode and the scanning position of the laser beam L in the main reading mode do not correspond to each other, making it impossible to establish accurate reading conditions and/or image processing conditions. Another problem is that the laser beam L may be vignetted by the ends of the light guide 14 disposed near the stimulable phosphor sheet S, also making it impossible to establish reading conditions and/or image processing conditions.

If the scanning position of the light beam is deviated from from a proper position not only in the preliminary reading mode but also in a general light beam scanning apparatus, no accurate image can be read or recorded.

SUMMARY OF THE INVENTION

It is a major object of the present invention to provide a light beam scanning apparatus having a light detector means for detecting a light beam to detect the scanning position of the light beam with respect to an auxiliary scanning direction, so that the scanning position of the light beam can accurately be adjusted on the basis of the detected positional information.

Another object of the present invention is to provide a light beam scanning apparatus for scanning an object by applying a light beam deflected in a main scanning direction to the object while moving the object in an auxiliary scanning direction substantially normal to the main scanning direction, the light beam scanning apparatus comprising first and second light detecting means juxtaposed in the main scanning direction and having respective light detecting surfaces extending in the auxiliary scanning direction such that the first and second light detecting means produce respective output signals at a predetermined ratio when the light beam for scanning the object in the main scanning direction is in a reference main scanning position, and produce respective output signals at ratio varied from the predetermined ratio when the light beam is deviated from the reference main scanning position, whereby the main scanning position of the light beam with respect to the object can be detected from the ratio of the output signals of the first and second light detecting means.

Still another object of the present invention is to provide a light beam scanning apparatus wherein the light detecting surface of the first and/or second light detecting means is partly shielded by a light-shielding member.

Yet another object of the present invention is to provide a light beam scanning apparatus for scanning an object by applying a light beam deflected in a main scanning direction to the object while moving the object in an auxiliary scanning direction substantially normal to the main scanning direction, the light beam scanning apparatus comprising light beam adjusting means for enlarging the diameter of the light beam, the light beam adjusting means being positionally adjustable on a path of the light beam, and light beam detecting means for detecting the light beam at a scanning position on the object, the arrangement being such that the light beam adjusting means is positionally adjustable dependent on light beam information detected by the light beam detecting means.

Yet still another object of the present invention is to provide a light beam scanning apparatus wherein the light beam adjusting means comprises light beam diameter enlarging means displaceable into and out of the path of the light beam, light path changing means for changing the path of the light beam, and light power reducing means for reducing the power of the light beam.

A further object of the present invention is to provide a light beam scanning apparatus wherein the light beam diameter enlarging means comprises an optical element for converging or diverging the light beam.

A still further object of the present invention is to provide a light beam scanning apparatus wherein the light path changing means comprises an optical element for refracting the light beam.

A yet further object of the present invention is to provide a light beam scanning apparatus wherein the light power reducing means comprises a filter.

Another object of the present invention is to provide a light beam scanning apparatus wherein wherein the light path changing means and the light power reducing means comprise an optical element composed of a plane-parallel plate with a coating thereon.

Still another object of the present invention is to provide a light beam scanning apparatus wherein the object comprises a stimulable phosphor sheet on which radiation image information is recorded, the light beam adjusting means comprising means for enlarging the diameter of a stimulating light beam and changing the path of the stimulating light beam to produce a light beam in a preliminary reading mode, the arrangement being such that the light beam in the preliminary reading mode at the scanning position on the stimulable phosphor sheet is detected by the light beam detecting means, and the light beam adjusting means is positionally adjustable dependent on the light beam information detected by the light beam detecting means.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 2:
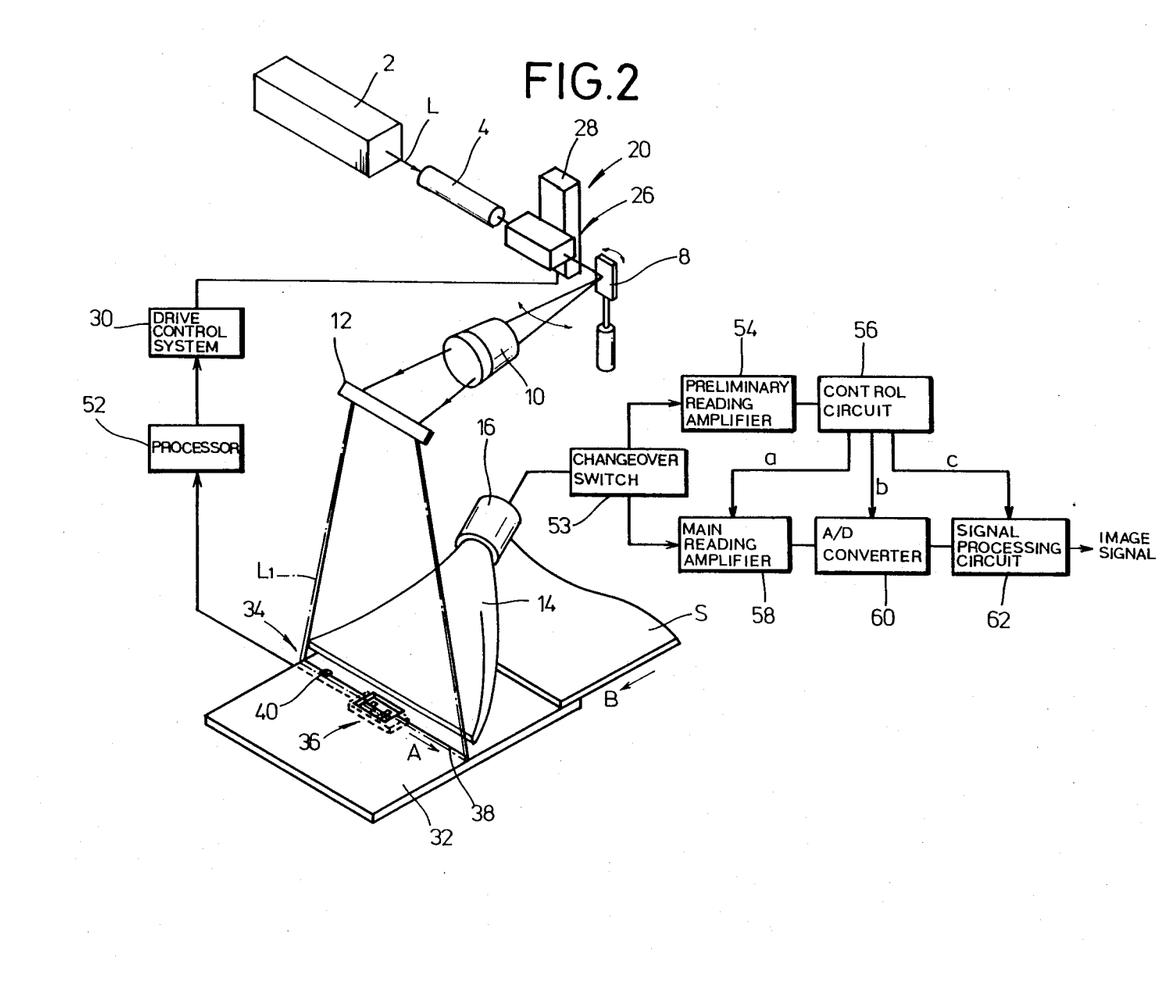
FIG. 2 is a schematic perspective view, partly in block form, of an image reading apparatus employed as a light beam scanning apparatus according to the present invention.

FIG. 2 schematically shows an image reading apparatus employed as a light beam scanning apparatus according to the present invention. Those parts in FIG. 2 which are identical to those of FIG. 1 are denoted by identical reference, and will only briefly be described below.

The image reading apparatus includes a scanning optical system comprising a laser oscillating tube 2, a beam expander 4, a light beam adjusting means 20 serving as a preliminary reading optical system, a galvanometer mirror 8, a scanning lens 10, and a mirror 12.

Figure 3:
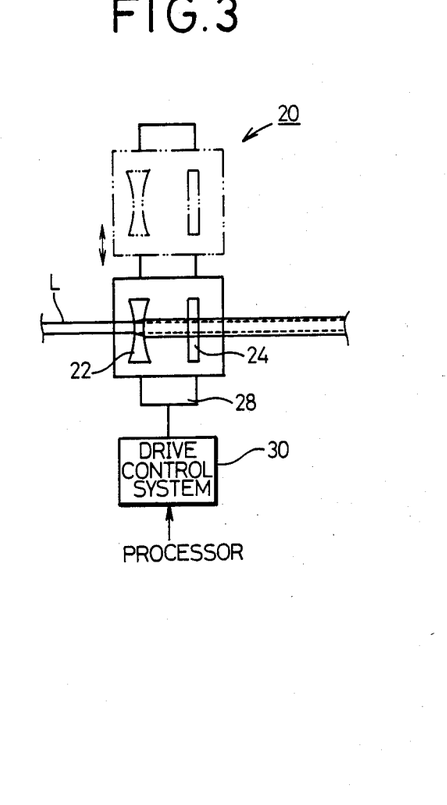
FIG. 3 is a view explaining operation of a light beam adjusting means of the light beam scanning apparatus of the present invention.

As illustrated in FIG. 3, the light beam adjusting means 20 has a concave lens 22 and an ND filter 24. The concave lens 22 serves as a light beam expanding means for increasing the diameter of a laser beam L on a stimulable phosphor sheet S. The ND filter 24 serves to reduce the power of the laser beam L. The light beam adjusting means 20 also has a driver means 26 comprising a drive source 28 such as a motor and a drive control system 30. In a preliminary reading mode, the light beam adjusting means 20 can effect fine adjustment on its amount of movement based on information (such as on laser beam position and laser beam diameter) of a preliminary reading laser beam L. In a main reading mode, the light beam adjusting means 20 can be moved out of the path of the laser beam L by the driver means 26 so as not to affect the laser beam L.

The laser beam L emitted from the laser oscillating tube 2 is applied through the scanning optical system to a stimulable phosphor sheet S or a sheet holder or table 32. The sheet holder 32 supports thereon the stimulable phosphor sheet S as it is fed in an auxiliary scanning direction indicated by the arrow B by a feed mechanism (not shown), to keep the stimulable phosphor sheet S as flat as desired.

A unit 36 serving as a light beam detector means is disposed underneath the sheet holder 32. The sheet holder 32 has an opening 42 defined therein just above the unit 36, the opening 42 being located in a position across which a beam spot 40 of the laser beam L runs along a main scanning line 38.

Figure 4:
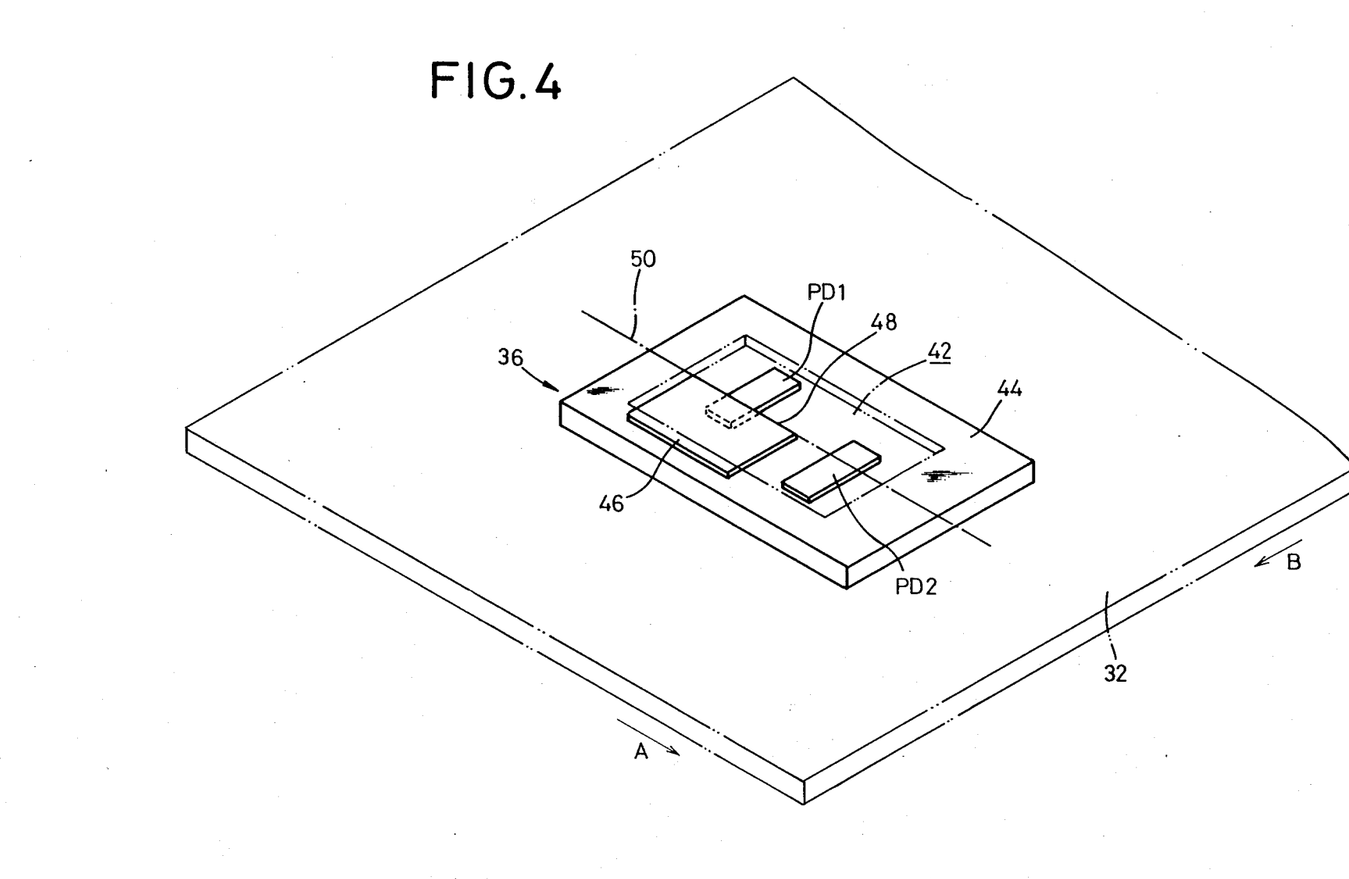
FIGS. 4 and 5 are perspective and plan views of certain components of the light scanning apparatus of the present invention.
Figure 5:
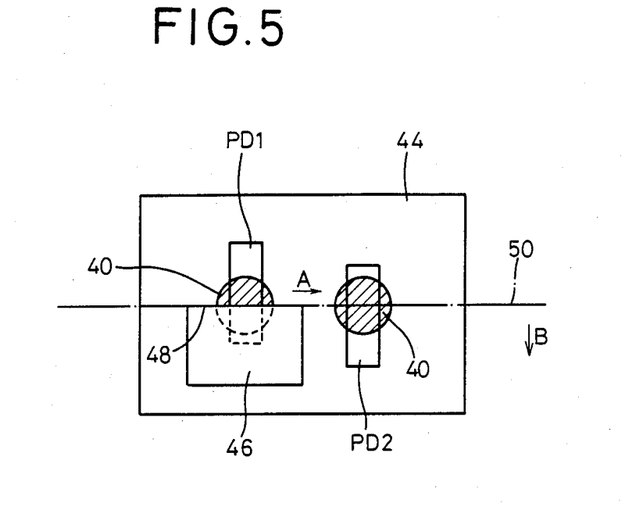

As shown in FIGS. 4 and 5, the unit 36 basically comprises a base board 44 mounted on the lower surface of the sheet holder 32, photoelectric transducers such as photodiodes PD1, PD2 disposed on the upper surface of the base board 44 and positioned in the opening 42 in the sheet holder 32, and a light-shielding plate 46 which covers a portion of the photodiode PD1. The photodiodes PD1, PD2 have light detecting surfaces elongate in the auxiliary scanning direction indicated by the arrow B, and are spaced a distance from each other in a main scanning direction indicated by the arrow A. The light detecting surface of he photodiode PD1 is party shielded by the light-shielding plate 46 in the auxiliary scanning direction of the arrow B. The light-shielding plate 46 has an edge 46 aligned with a reference line 50 which is followed by the center of the beam spot 40 when the laser beam L scans a desired area of the sheet holder 32 in the main scanning direction. The photoelectric transducers may instead be known position sensors such as phototransistors.

Light beam information (on beam position and beam diameter) of the laser beam L, which has been detected by the photodiodes D1, D2 of the light beam detector means is supplied to a processor 52, which enables the drive control system 30 to energize the drive source 28 based on the detected light beam information.

In an image reading unit 34, a light guide 14 has one end disposed near the main scanning line 38 of the laser beam L and the other end coupled to a photomultiplier 16. The photomultiplier 16 has a light detecting surface on which a filter (not shown) is mounted. The filter on the photomultiplier 16 serves to cut off stimulating light which has been reflected and applied through the light guide 14, but to allow only light emitted from the stimulable phosphor sheet S to pass to the photomultiplier 16. Therefore, the photomultiplier 16 detects only light emitted from the stimulable phosphor sheet S for photoelectrically converting the radiation image information recorded on the stimulable phosphor sheet S into an electric signal.

The electric signal detected by the photomultiplier 16 is applied via a changeover switch 53 to a preliminary reading amplifier 54 and amplified thereby. Thereafter, the amplified signal is sent to a control circuit 56 in which reading conditions in a main reading mode such as a preset amplification factor a, a preset recording scale factor b, and a preset image processing condition c are established dependent on the obtained radiation image information. The preset amplification factor a, the preset recording scale factor b, and the preset image processing condition c are supplied to a main reading amplifier 58, an A/D converter 60, and a signal processing circuit 62, respectively.

The light beam scanning apparatus according to the above embodiment is basically constructed as described above. Operation and advantages of the light beam scanning apparatus will now be described below.

Prior to the main reading mode, the radiation image information recorded on the stimulable phosphor sheet S is read in the preliminary reading mode. The drive source 28 of the light beam adjusting means 20 is operated to insert the concave lens 22 and the ND filter 24 of the preliminary reading optical system into the light path of the laser beam L between the beam expander 4 and the galvanometer mirror 8.

If the concave lens 22 is inserted into an inaccurate position, then the scanning position of the laser beam L with respect to the stimulable phosphor sheet S is subjected to an error. To avoid this, the scanning position of the laser beam L is confirmed before the stimulable phosphor sheet S is placed on the sheet holder 32, and the scanning position is adjusted if necessary.

More specifically, the laser beam L emitted from the laser oscillating tube 2 is applied via the beam expander 4 to the concave lens 22 by which the diameter of the laser beam L is increased to a prescribed beam diameter. Thereafter, the power of the laser beam L is reduced by the ND filter 24. Then, the laser beam L with its diameter increased is deflected by the galvanometer mirror 8 and applied via the scanning lens and the mirror 12 to the sheet holder 32. The beam spot 40 of the laser beam L scans the unit 36 of the light beam detecting means in the main scanning direction of the arrow A through the opening 42 defined centrally in the sheet holder 32 (see FIG. 5).

Figure 6:
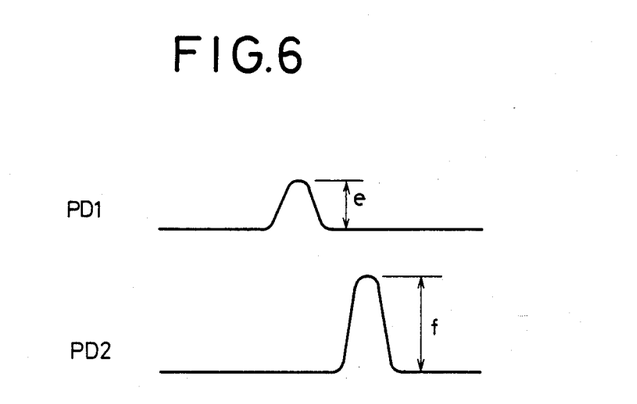
FIG. 6 is a diagram explaining output signals from a light detector means of the light scanning apparatus of the invention.

If the concave lens 22 is properly inserted in a desired position in the laser beam path, then the beam spot 40 scans the unit 36 in the main scanning direction while the center of the beam spot 40 is in alignment with the reference line 50. At this time, the beam spot 40 applied to the photodiode PD1 is shielded by half on one side of the reference line 50 in the auxiliary scanning direction of the arrow B by the light-shielding plate 46. The beam spot 40 is entirely applied to the other photodiode PD2. Therefore, where the photodiodes PD1, PD2 are of equal sensitivity, the output peak levels e, f of the respective photodiodes PD1, PD2 shown in FIG. 6 are of a ratio of 1:2. Based on this output peak level ratio, it is detected that the concave lens 22 is properly inserted in the desired position in the light path of the laser beam L and hence the beam spot 40 accurately scans a desired position on the sheet holder 32.

If the concave lens 22 is not properly inserted in a desired position in the laser beam path, on the other hand, the center of the beam spot 40 scans the unit 36 at a position which is deviated from the reference line 50 in the auxiliary scanning direction B. At this time, the ratio between the output peak levels e, f of the photodiodes PD1, PD2 is not 1:2. After the light beam information (on beam position and beam diameter) of he laser beam L which has been detected by the photodiodes PD1, PD2 is supplied to the processor 52, the processor 52 controls the drive control system 30 to actuate the drive source 28. The concave lens 22 and the ND filter 24 are moved together selectively in the directions of the arrows to adjust the position of the concave lens 22 until the ratio of the output peak values e, f reaches 1:2 In this manner, the scanning position of the beam spot 40 with respect to the sheet holder 32 can accurately be adjusted.

After the scanning position of the laser beam L with respect to the sheet holder 32 has been confirmed or adjusted, the stimulable phosphor sheet S is fed into the image reading unit 34. The laser beam L is then applied, as the beam spot 40 which has its beam diameter enlarged by the concave lens 22 and its energy intensity lowered by the ND filter 24, to the stimulable phosphor sheet S to scan the same in the main scanning direction A. As the stimulable phosphor sheet S is scanned by the beam spot 40, it emits light which is applied via the light guide 14 to the photomultiplier 16 by which the light is converted into an electric signal.

The electric signal detected by the photomultiplier 16 is applied via the changeover switch 53 to the preliminary reading amplifier 54 and amplified thereby. Thereafter, the amplified signal is sent to the control circuit 56 in which reading conditions in a main reading mode such as a preset amplification factor a, a preset recording scale factor b, and a preset image processing condition c are established dependent on the obtained radiation image information.

The scanning position of the beam spot 40 of the laser beam L has been detected by the photodiodes PD1, PD2 in the sheet holder 32, and accurately adjusted with respect to the sheet holder 32. Therefore, the laser beam L is not vignetted by the light guide 14 or the like, and is applied to the stimulable phosphor sheet S accurately at a desired position thereon. Therefore, the preset amplification factor a, the recording scale factor b, and the image processing condition c in the main reading mode can highly accurately be established on the basis of the image signal obtained from the stimulable phosphor sheet S. At this time, the photodiodes PD1, PD2 are shielded from the laser beam L by the stimulable phosphor sheet S placed on the sheet holder 34. Consequently, the photodiodes PD1, PD2 are effective in detecting the insertion of the stimulable phosphor sheet S in the image reading unit 34 as well as the scanning position of the laser beam L.

Figure 7:
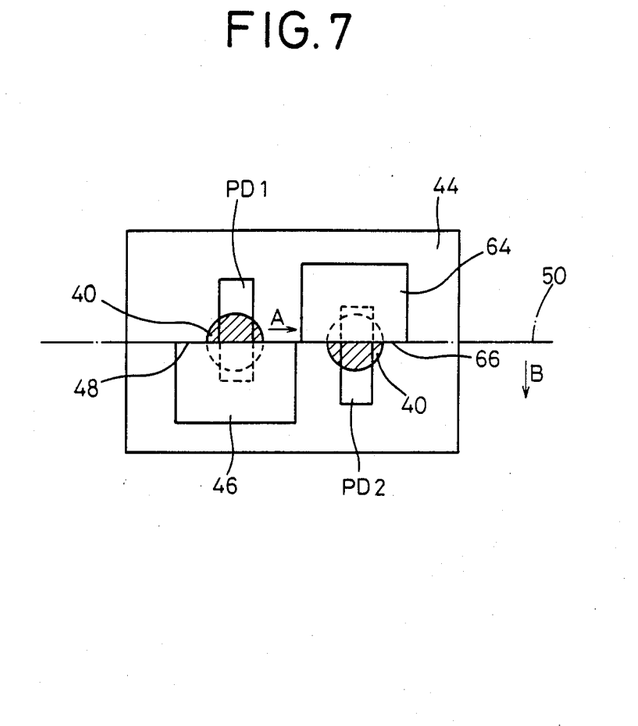
FIG. 7 is a fragmentary plan view of a light beam scanning apparatus according to another embodiment of the present invention.

In the aforesaid embodiment, the light-shielding plate 46 is mounted on the photodiode PD1 only, and the concave lens 22 is positionally adjusted so that the ratio between the output peak values e, f of the photodiodes PD1, PD2 will be 1:2. However, as shown in FIG. 7, the light detecting surface of the photodiode PD2 may be partly covered with a light-shielding plate in substantially symmetrical relation to the light-shielding plate 46 with respect to the reference line 50, with the light-shielding plate 64 having an edge aligned with the reference line 50. With this arrangement, the scanning position of the beam spot 40 can accurately be established by positionally adjusting the concave lens 22 so that the ratio of the output peak values of the photodiodes PD1, PD2 will becomes 1:1.

Then, the radiation image information on the stimulable phosphor sheet S is read in the main reading mode. The stimulable phosphor sheet S is moved back to a reading starting position by the feed means (not shown). The concave lens 22 and the ND filter 24 are retracted out of the light path of the laser beam L by the driver means 26.

Then, the laser beam L from the laser oscillating tube 2 is applied, with its beam diameter strictly adjusted by the beam e pander 4, to the galvanometer mirror 8. Then, the laser beam L is deflected by the galvanometer mirror 8, while at the same time the scanning speed of the laser beam L is adjusted by the scanning lens 10. The laser beam L is reflected by the mirror 12 to scan the stimulable phosphor sheet S in the main scanning direction of the arrow A. At this time, the laser beam L is applied to a prescribed scanning position on the sheet S with a predetermined beam diameter and energy intensity. The stimulable phosphor sheet S is fed in the auxiliary scanning direction B by the non-illustrated feed means, with the result that the stimulable phosphor sheet S is two-dimensionally scanned over its entire surface. As a consequence, the image information borne by the stimulable phosphor sheet S is sent as emitted light via the light guide 14 to the photomultiplier 16. The photomultiplier 16 then photoelectrically converts the applied light into an electric signal, which is transferred via the changeover switch 53 to the main reading amplifier 58.

The electric signal supplied to the main reading amplifier 58 is amplified into an electric signal of a suitable level based on the amplification factor a established in the preliminary reading mode. The amplified electric signal is applied to the A/D converter 60 which converts the signal into a digital signal with a scale factor suitable for the signal variation range based on the recording scale factor b established in the preliminary reading mode. The digital signal is then applied to the signal processing circuit 62 which processes the signal based on the image processing condition c established in the preliminary reading mode for reproducing an image of excellent observability. For example, the image signal is sent to an image recording apparatus (not shown) in which the image is recorded on a recording material such as a photographic photosensitive medium by employing a laser beam modulated by the image signal. Then, the image recorded on the photographic photosensitive medium is developed into a visible image, after which it is stored in a prescribed location and will be used for medical diagnosis or the like.

In the above embodiments, the light beam position is detected in the preliminary reading mode for preliminarily reading the image information from the stimulable phosphor sheet S. However, the present invention is also applicable to the detection of a light beam in the auxiliary scanning direction in a general light beam scanning apparatus.

In the case where the laser beam L in the preliminary scanning mode is likely to be vignetted by the light guide 14, the laser beam L can be applied as the beam spot 40 to the sheet holder 32 and the stimulable phosphor sheet S at a position spaced from the light guide 14.

Figure 8:
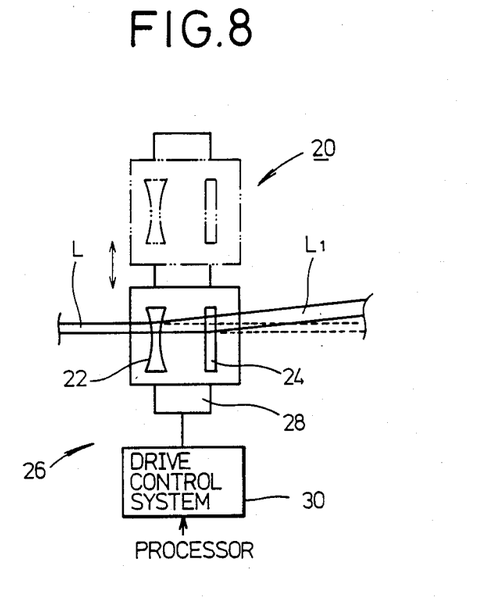
FIG. 8 is a view explaining another mode of use of the light beam adjusting means shown in FIG. 3.

More specifically, as illustrated in FIG. 8, the central optical axis of the concave lens 22 of the light beam adjusting means 20 is displaced a prescribed amount from the light path of the laser beam L. A laser beam $L_1$ which has passed through the concave lens 22 travels through a light path different from that of the laser beam L to scan the sheet holder 32 in the main scanning direction along a broken line shown in FIG. 2. In this manner, the preliminary reading laser bean L which is of a relatively large beam diameter is prevented from being vignetted by the light guide 14.

While the single concave lens 22 serves as both a light beam diameter enlarging means and a light path changing means and the ND filter 24 serves as a light power reducing means in the above embodiments, the light beam diameter enlarging means, the light path changing means, and the light power reducing means may independently be employed as separate means.

The light beam diameter enlarging means may be a suitable means, such as a convex lens, capable of increasing the beam diameter on the stimulable phosphor sheet S up to a desired diameter (e.g., about 3 mm).

The light path changing means may be a convex lens with its optical axis displaced off the laser beam path or a prism, for example, insofar as they can be moved into a position for preventing the preliminary reading laser beam $L_1$ with an enlarged diameter from being blocked by the light guide 16. Alternatively, a transparent inclined plane-parallel plate 68 may be employed as the light path changing means in a light beam adjusting means 20a shown in FIG. 9.

Figure 9:
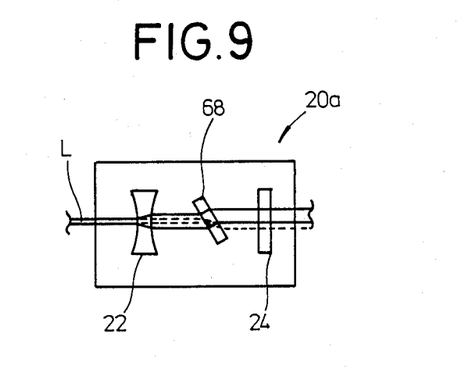
FIG. 9 is a view of a light beam adjusting means according to another embodiment of the present invention.

In the light beam adjusting means 20a of FIG. 9, the concave lens 22 is positioned such that the laser beam L is applied thereto in alignment with its central optical axis. The plane-parallel plate 68 which is inclined to the vertical direction is interposed between the concave lens 22 and the ND filter 24. Therefore, after the diameter of the laser beam L has been increased by the concave lens 22, the laser beam L changes its path by passing through the plane-parallel plate 68. Then, the power of the laser beam L is reduced by the ND filter 24, after which it is applied as the preliminary reading laser beam $L_1$ to the galvanometer mirror 8.

The light power reducing may be a suitable means capable of reducing the power of the laser beam L which has been adjusted for use in the main reading mode, to a preliminary reading energy level, while the beam diameter is enlarged, but should preferably be the ND filter 24. The ND filter 24 may however be dispensed with by constructing the pane-parallel plate 68 with a filter coating so that the plane-parallel plate 68 can double as a filter.

In the aforesaid light beam adjusting means 20, 20a, the light beam diameter enlarging means, the light path changing means, and the light power reducing means are put together into one unit and movable in unison by the driver means 26. However, the light beam diameter enlarging means, the light path changing means, and the light power reducing means may be separately be disposed and individually moved.

While the information (on beam position and beam diameter) of the preliminary reading laser beam L ($L_1$) detected by the light beam detecting means is detected as an electric signal and the electric signal is sent to the driver means 26 for positionally adjusting the light beam adjusting means 20 in the aforesaid embodiments, the information detected by the light beam detecting means may be presented as a visual indication, and the light beam adjusting means 20 may be positionally adjusted manually by the operator based on the visual indication.

With the present invention, as described above, two light detecting means having respective light detecting surfaces with their light detecting positions different with respect to the auxiliary scanning direction are spaced from each other or juxtaposed in the main scanning direction, and the scanning position of the light beam is detected on the basis of the ratio of output signals from the light detecting means. Therefore, the scanning position of the light beam with respect to the auxiliary scanning direction can be detected accurately through a highly simple structure. It is quite easy to correct the scanning position of the light beam based on the result of the detection.

Furthermore, according to the present invention, light beam information at the reading position is detected substantially in the preliminary reading mode, and the light beam adjusting means is adjusted dependent on the detected light beam information. Accordingly, the enlargement of the light beam diameter and the changing of the light beam path can be effected highly accurately. Even if the light beam is positionally displaced in the preliminary reading mode, it can be positionally adjusted by the light beam adjusting means, so that the light beam can be kept at a proper beam position with a proper beam diameter at all times.

The light-shielding plate or plates may be dispensed with by displacing the two photodiodes a certain distance from each other with respect to the auxiliary scanning direction.

Although certain preferred embodiments have been shown and described, it should be understood that many changes and modifications may be made therein without departing from the scope of the appended claims.

What is claimed is:

1. A light beam scanning apparatus for scanning an object by applying a light beam deflected in a main scanning direction to the object while moving said object in an auxiliary scanning direction substantially normal to said main scanning direction, said light beam scanning apparatus comprising first and second light detecting means juxtaposed in said main scanning direction and having respective light detecting surfaces extending in said auxiliary scanning direction such that said first and second light detecting means produce respective output signals at a predetermined ratio when the light beam for scanning the object in the main scanning direction is in a reference main scanning position, and produce respective output signals at a ratio varied from said predetermined ratio when the light beam is deviated from said reference main scanning position, whereby the main scanning position of the light beam with respect to said object can be detected from the ratio of the output signals of said first and second light detecting means.

2. A light beam scanning apparatus according to claim 1, wherein the light detecting surface of said first and/or second light detecting means is partly shielded by a light-shielding member.

3. A light beam scanning apparatus for scanning an object by applying a light beam deflected in a main scanning direction to the object while moving said object in an auxiliary scanning direction substantially normal to said main scanning direction, said light beam scanning apparatus comprising light beam adjusting means for enlarging the diameter of the light beam, said light beam adjusting means being positionally adjustable on a path of said light beam, and light beam detecting means for detecting the light beam at a scanning position on said object, the arrangement being such that said light beam adjusting means is positionally adjustable dependent on light beam information detected by said light beam detecting means.

4. A light beam scanning apparatus according to claim 3, wherein said light beam adjusting means comprises light beam diameter enlarging means displaceable into and out of said path of the light beam, light path changing means for changing the path of the light beam, and light power reducing means for reducing the power of the light beam.

5. A light beam scanning apparatus according to claim 4, wherein said light beam diameter enlarging means comprises an optical element for converging or diverging the light beam.

6. A light beam scanning apparatus according to claim 4, wherein said light path changing means comprises an optical element for refracting the light beam.

7. A light beam scanning apparatus according to claim 4, wherein said light power reducing means comprises a filter.

8. A light beam scanning apparatus according to claim 4, wherein said light path changing means and said light power reducing means comprise an optical element composed of a plane-parallel plate with a coating thereon.

9. A light beam scanning apparatus according to claim 3, wherein said object comprises a stimulable phosphor sheet on which radiation image information is recorded, said light beam adjusting means comprising means for enlarging the diameter of a stimulating light beam and changing the path of the stimulating light beam to produce a light beam in a preliminary reading mode, the arrangement being such that said light beam in the preliminary reading mode at the scanning position on the stimulable phosphor sheet is detected by the light beam detecting means, and said light beam adjusting means is positionally adjustable dependent on the light beam information detected by said light beam detecting means.

* * * * *